United States Patent
Koguchi et al.

(10) Patent No.: US 9,633,471 B2
(45) Date of Patent: Apr. 25, 2017

(54) IMAGE PROCESSING DEVICE, IMAGE PROCESSING METHOD, COMPUTER PROGRAM, AND RECORDING MEDIUM

(71) Applicant: Sony Computer Entertainment Inc., Tokyo (JP)

(72) Inventors: Takahiro Koguchi, Tokyo (JP); Shinya Wada, Kanagawa (JP)

(73) Assignees: SONY CORPORATION, Tokyo (JP); SONY INTERACTIVE ENTERTAINMENT INC., Tokyo (JP)

( * ) Notice: Subject to any disclaimer, the term of this patent is extended or adjusted under 35 U.S.C. 154(b) by 66 days.

(21) Appl. No.: 14/703,245

(22) Filed: May 4, 2015

(65) Prior Publication Data
US 2015/0348314 A1 Dec. 3, 2015

(30) Foreign Application Priority Data
Jun. 2, 2014 (JP) ................................. 2014-114334

(51) Int. Cl.
*G06T 15/50* (2011.01)
*G06T 15/06* (2011.01)

(52) U.S. Cl.
CPC ............ *G06T 15/506* (2013.01); *G06T 15/06* (2013.01)

(58) Field of Classification Search
CPC ........... G06T 2207/20208; G06T 5/009; G06T 7/408; G06T 19/00; G06T 5/003; G06T 5/007; G06T 5/008; G06T 17/005; G06T 15/06; G06T 15/08; G06T 15/506; G06T 15/80; G06T 15/40; G06T 15/50; G06T 2210/56
See application file for complete search history.

(56) References Cited

U.S. PATENT DOCUMENTS

| 5,808,620 A | * | 9/1998 | Doi .................... G06T 15/60 345/426 |
| 6,563,999 B1 | | 5/2003 | Suzuoki |
| 2010/0033482 A1 | * | 2/2010 | Zhou .................... G06T 15/50 345/424 |

OTHER PUBLICATIONS

Jensen, et al., High Quality Rendering using Ray Tracing and Photon Mapping, Siggraph 2007 Course 8, 130 pages.*
Hauagge et al., Photometric Ambient Occlusion, CVPR 2013, pp. 2515-2522.*

* cited by examiner

*Primary Examiner* — Haixia Du
(74) *Attorney, Agent, or Firm* — Katten Muchin Rosenman LLP

(57) ABSTRACT

An image processing device includes a photon map generator that constructs a virtual three-dimensional space as a rendering target and generates a photon map by distributing photons used for a photon mapping method, a low-luminance region identifying unit that identifies a low-luminance region estimated to have low luminance when the virtual three-dimensional space is projected onto a screen corresponding to a viewpoint by a method different from the photon mapping method, and a rendering part that collects photons corresponding to all pixels based on the photon map with reduction in the collection rate of photons corresponding to a pixel included in the low-luminance region compared with the other region, and calculates radiance to decide a pixel value and generate a display image.

9 Claims, 11 Drawing Sheets

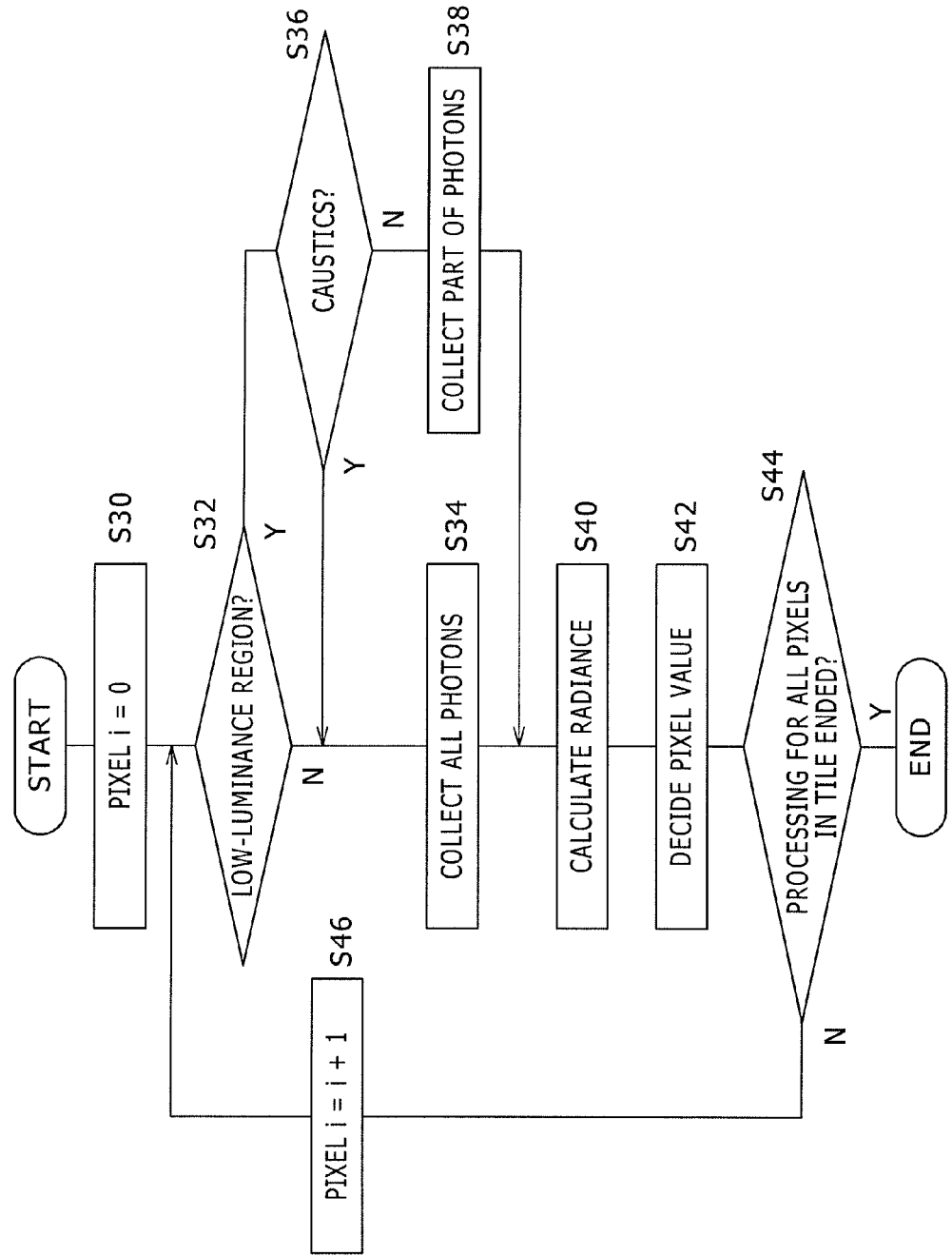

IMAGE PROCESSING DEVICE, IMAGE PROCESSING METHOD, COMPUTER PROGRAM, AND RECORDING MEDIUM

BACKGROUND

The present disclosure relates to an image processing device that renders an image, an image processing method used in the device, a computer program for implementing the method and a computer-readable recording medium recording the program.

A home entertainment system that not only executes a game program but also can reproduce a moving image has been proposed. In this home entertainment system, a Graphics Processing Unit (GPU) generates three-dimensional images using polygons (refer to e.g. U.S. Pat. No. 6,563, 999). At this time, how to express light in a space as the rendering target is an important factor that determines an impression made on a person who views the image. For example, compared with a local illumination model, in which an illumination calculation is performed from only direct light to objects, a global illumination model, in which indirect light such as reflected light from wall and floor is also taken into consideration, allows generation of more realistic images.

In the global illumination model, a simulation is performed on how light generated from a light source is affected by the existence of objects. For example, the following methods are known: ray tracing methods, in which light propagation between a viewpoint and a light source is traced, and radiosity methods, in which mutual reflection of the energy of light on object surfaces is calculated to obtain the final energy distribution. Furthermore, as one kind of ray tracing method, there is a photon mapping method, in which light is modeled as virtual particles (commonly known as "photon"). In the photon mapping method, a large amount of photons generated from a light source are propagated while being made to act with objects stochastically and positions at which the photons finally reach object surfaces are recorded as a photon map. Then, an approximation calculation of the radiance to each pixel is performed from the distribution of the photons as viewed from a viewpoint (refer to e.g. Toward Practical Real-time Photon Mapping: Efficient GPU Density Estimation, M Mara, D Luebke, M McGuire, Proceeding I3D '13 Proceedings of the ACM SIGGRAPH Symposium on Interactive 3D Graphics and Games, Pages 71 to 78).

SUMMARY

The higher the definition of an image is attempted to be made and the more complex the contents of displaying become, the more the load of processing for rendering increases and the more likely problems about operability and responsiveness become evident. For example, in the case of using the above-described photon mapping method, when the number of photons is increased in order to perform an illumination calculation with higher accuracy, it will take a very long time to perform a radiance calculation for each pixel and consequently smooth image displaying will be precluded. As above, improvement in the image quality and increase in the speed of rendering processing are in a trade-off relationship, which is typically a large issue.

There is a desire for the present disclosure to provide an image processing technique enabling rendering of a high-definition image at high speed.

According to an embodiment of the present disclosure, there is provided an image processing device. The image processing device includes a photon map generator configured to construct a virtual three-dimensional space as a rendering target and generate a photon map by distributing photons used for a photon mapping method, a low-luminance region identifying unit configured to identify a low-luminance region estimated to have low luminance when the virtual three-dimensional space is projected onto a screen corresponding to a viewpoint by a method different from the photon mapping method, and a rendering part configured to collect photons corresponding to all pixels based on the photon map with reduction in the collection rate of photons corresponding to a pixel included in the low-luminance region compared with the other region, and calculate radiance to decide a pixel value and generate a display image.

According to another embodiment of the present disclosure, there is provided an image processing method. The image processing method is an image processing method in which an image processing device renders a display image to be displayed on a display device. The image processing method includes constructing a virtual three-dimensional space as a rendering target and distributing photons used for a photon mapping method to generate and store a photon map in a memory, identifying a low-luminance region estimated to have low luminance when the virtual three-dimensional space is projected onto a screen corresponding to a viewpoint by a method different from the photon mapping method, and collecting photons corresponding to all pixels based on the photon map read out from the memory with reduction in the collection rate of photons corresponding to a pixel included in the low-luminance region compared with the other region, and calculating radiance to decide a pixel value and generate and output a display image to the display device.

According to a further embodiment of the present disclosure, there is provided a computer program for a computer. The program includes: constructing a virtual three-dimensional space as a rendering target and generating a photon map by distributing photons used for a photon mapping method; identifying a low-luminance region estimated to have low luminance when the virtual three-dimensional space is projected onto a screen corresponding to a viewpoint by a method different from the photon mapping method; and collecting photons corresponding to all pixels based on the photon map with reduction in a collection rate of photons corresponding to a pixel included in the low-luminance region compared with the other region, and calculating radiance to decide a pixel value and generate a display image.

According to a yet further embodiment of the present disclosure, there is provided a computer-readable recording medium on which a computer program for a computer is recorded. The computer program includes: constructing a virtual three-dimensional space as a rendering target and generating a photon map by distributing photons used for a photon mapping method; identifying a low-luminance region estimated to have low luminance when the virtual three-dimensional space is projected onto a screen corresponding to a viewpoint by a method different from the photon mapping method; and collecting photons corresponding to all pixels based on the photon map with reduction in a collection rate of photons corresponding to a pixel included in the low-luminance region compared with the other region, and calculating radiance to decide a pixel value and generate a display image.

What are obtained by translating arbitrary combinations of the above constituent elements and expressions of the present disclosure among method, device, system, computer program, and so forth are also effective as embodiments of the present disclosure.

According to the embodiments of the present disclosure, a high-definition image can be rendered at higher speed.

BRIEF DESCRIPTION OF THE DRAWINGS

FIG. 12 is a flowchart showing a processing procedure in which the rendering block decides pixel values in a tile region in S18 in FIG. 11.

DETAILED DESCRIPTION OF THE PREFERRED EMBODIMENT

Figure 1:
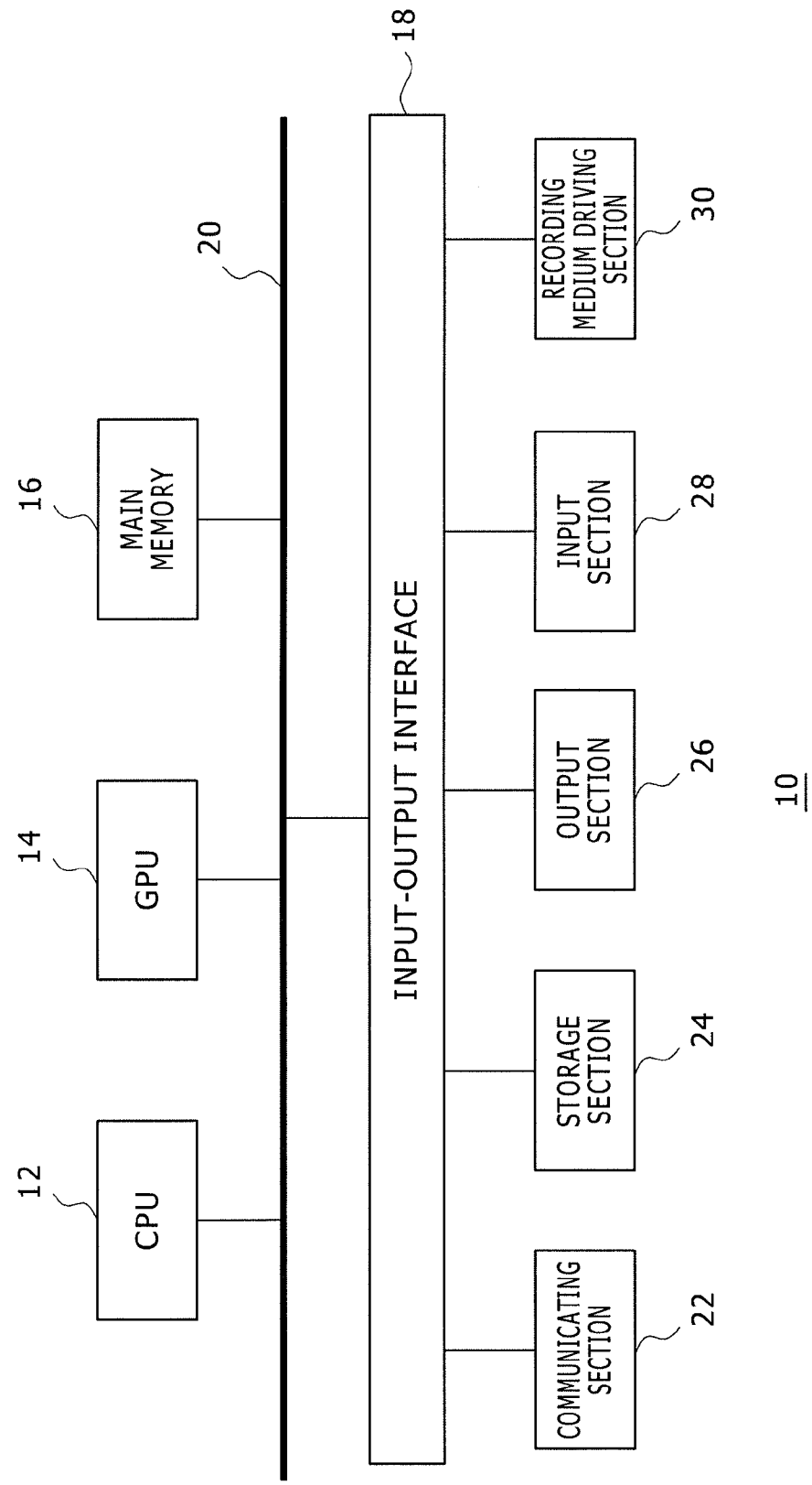
FIG. 1 is a diagram showing the internal circuit configuration of an image processing device in an embodiment of the present disclosure.

FIG. 1 shows the internal circuit configuration of an image processing device according to an embodiment of the present disclosure. An image processing device 10 includes a central processing unit (CPU) 12, a graphics processing unit (GPU) 14, and a main memory 16. The CPU 12 controls signal processing and internal constituent elements based on programs such as an operating system and applications. The GPU 14 executes image processing.

These sections are mutually connected via a bus 20. Furthermore, an input-output interface 18 is connected to the bus 20. To the input-output interface 18, the following sections are connected: a communicating section 22 formed of peripheral apparatus interfaces of USB, IEEE 1394, etc. and a network interface of a wired or wireless LAN; a storage section 24 such as a hard disk drive or a non-volatile memory; an output section 26 that outputs data to output devices such as display device and speaker; an input section 28 to which data are input from input devices such as keyboard, mouse, game controller, microphone, and camera; and a recording medium driving section 30 that drives a removable recording medium such as a magnetic disc, optical disc, or semiconductor memory.

The CPU 12 carries out overall control of the image processing device 10 by executing the operating system stored in the storage section 24. Furthermore, the CPU 12 executes various kinds of programs read out from a removable recording medium to be loaded into the main memory 16 or downloaded via the communicating section 22. The GPU 14 has functions of a geometry transfer engine and functions of a rendering processor. The GPU 14 executes rendering processing in accordance with a rendering instruction from the CPU 12 and stores a display image in a frame memory (not shown). Then, the GPU 14 converts the display image stored in the frame memory to a video signal and outputs it to the output section 26 or the like.

Figure 2:
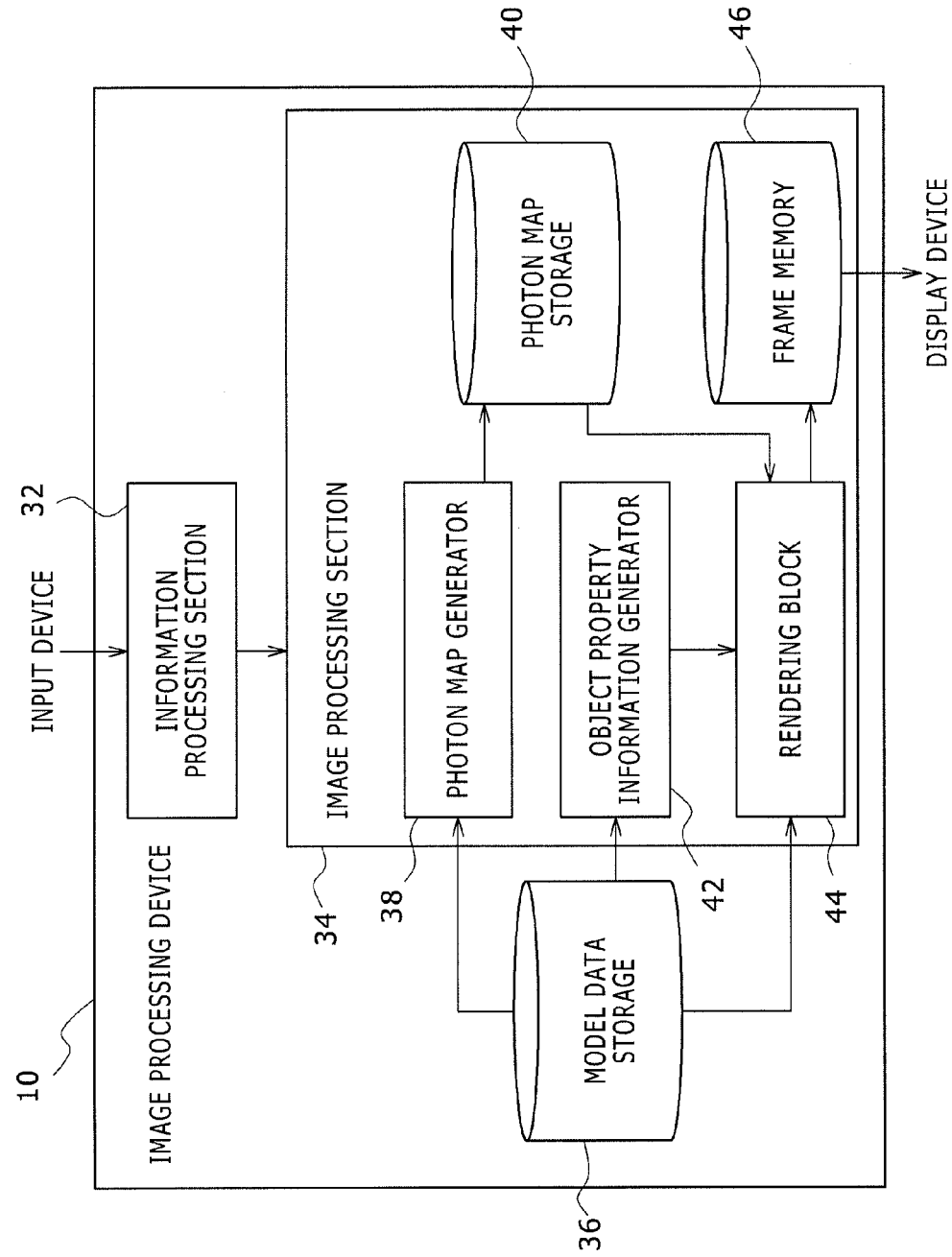
FIG. 2 is a functional block diagram of the image processing device in the embodiment.

FIG. 2 shows functional blocks configuring the image processing device 10. In terms of hardware, the respective elements described as functional blocks that execute various kinds of processing in FIG. 2 and FIG. 6 to be described later can be formed by CPU, GPU, memory, and other LSIs as described above. In terms of software, they are implemented by programs to execute image processing and various kinds of operations or the like. Therefore, it is to be understood by those skilled in the art that these functional blocks can be implemented in various forms by only hardware, or only software, or a combination of them, and these functional blocks are not limited to any one of the forms.

The image processing device 10 includes an information processing section 32 that executes information processing according to an instruction input by a user, an image processing section 34 that executes image processing in accordance with a request from the information processing section 32, and a model data storage 36 that stores data used for the image processing. The information processing section 32 is formed of the CPU 12, the main memory 16, the input-output interface 18, and the input section 28 in FIG. 1, and so forth. The information processing section 32 acquires information relating to user operation from an input device such as a game controller or a keyboard and executes information processing according to the information, and then requests the image processing section 34 to execute corresponding image processing. The contents and object of the information processing executed by the information processing section 32 are not particularly limited as long as the information processing involves displaying of a virtual three-dimensional space, as in a game, community formation by use of avatars, etc.

For example, in the case of executing a game, there may be a mode in which a user moves the viewpoint or makes some action by using an input device while viewing an image representing a virtual world displayed on a display device. In this case, the information processing section 32 receives an input signal according to the contents of the user's operation to the input device and decides a change in the viewpoint and objects corresponding to the contents of operation, and requests the image processing section 34 to generate a display image. The processing executed by the information processing section 32 may be equivalent to processing executed by a CPU and so forth in a general game device or information processing device.

The image processing section 34 is formed of the GPU 14, the main memory 16, the input-output interface 18, and the output section 26 in FIG. 1, and so forth. The image processing section 34 generates data of an image to be displayed on the display device in accordance with a request from the information processing section 32. This processing is basically similar to general computer graphics processing to render a display image by constructing a virtual three-dimensional space in which objects to be displayed exist and projecting the objects onto a screen plane settled according to a viewpoint. Thus, model data of the objects used for the rendering are stored in the model data storage 36.

In the present embodiment, a photon mapping method is used particularly in processing of shading and shadowing. The photon mapping method is a technique in which virtual particles (hereinafter, referred to as "photons") are used for modeling light and are scattered, and the radiance to pixels is approximated according to the distribution of the photons. Any of general techniques can be employed for rendering processing other than this processing of shading and shadowing as described above. Therefore, description of the rendering processing will be appropriately omitted and the following description will be made with focus paid to processing based on photon mapping.

The image processing section 34 includes the following blocks: a photon map generator 38 that generates a photon map based on a result of scattering of the photons in a virtual three-dimensional space as a rendering target; a photon map storage 40 that stores the generated photon map; an object property information generator 42 that generates property information relating to the shape and placement of objects in the virtual three-dimensional space; a rendering block 44 that executes rendering processing including shading and shadowing using the photon map and generates a display image; and a frame memory 46 that stores data of the display image to be output to the display device.

The photon map generator 38 generates the photon map by a processing procedure generally carried out in the photon mapping method. The photon map is data obtained by recording parameters, such as the incident position, the radiant flux, and the incident direction, of photons that are propagated from a light source to be finally absorbed by an object surface about all photons. Furthermore, as described later, the number of times of reflection at an object surface in the process of the propagation, the number of times of transmission through an object, and so forth are recorded as history information for each photon. The generated photon map is stored in the photon map storage 40. Because the photon map itself does not change in association with the movement of the viewpoint, the photon map generator 38 generates the photon map according to the shape and placement of objects in the virtual three-dimensional space and updates it as appropriate when they change.

The object property information generator 42 identifies, on the screen plane, regions estimated to have low luminance in advance as low-luminance regions. Examples of the low-luminance region identified include a region representing a small space generated attributed to the shape and positional relationship of an object, a region where a shadow is generated by direct light depending on the positional relationship with the light source, and a region where the luminance is equal to or lower than a predetermined value as color information of a texture, such as a region where the color of an object is black or a dark color. Specifically, in the present embodiment, prior to shading and shadowing based on photon mapping, regions with low luminance are extracted by a method different from it. Furthermore, the object property information generator 42 generates basic data used for identification of the low-luminance regions and rendering of the display image, such as a Z-buffer and a normal buffer. These data are represented on the screen plane and therefore are updated as appropriate in association with the movement of the viewpoint.

The rendering block 44 reads out model data of objects from the model data storage 36 and performs coordinate conversion of a background and the objects according to the viewpoint to render a display image. At this time, the rendering block 44 performs shading and shadowing by using the photon map stored in the photon map storage 40. Specifically, the rendering block 44 collects photons existing near a position corresponding to a respective one of the pixels of the screen plane among the photons distributed in the virtual three-dimensional space, and decides the radiance to each pixel based on the radiant flux and the incident angle of the photons.

The rendering block 44 reduces the number of photons incorporated in the calculation of the radiance in the low-luminance region identified by the object property information generator 42. The present inventor has attained distinctive knowledge that the apparent impression does not change even when the radiance calculation based on the photon mapping is simplified regarding a part that in advance proves to have low luminance due to properties of object, such as its shape, placement, and original color. Therefore, the load of the radiance calculation is reduced without lowering the overall image quality by identifying such a low-luminance region in advance and reducing the number of extracted photons only in this region.

The rendering block 44 stores the data of the generated display image in the frame memory 46. Then, the data is so controlled as to be output to the display device at proper timing to thereby allow the image to be displayed. Alternatively, the data may be transmitted to an external device via a network. Next, the photon mapping will be outlined. The photon mapping is one kind of ray tracing method and studies thereon are being advanced as described in detail in e.g. the above-cited non-patent document (Toward Practical Real-time Photon Mapping: Efficient GPU Density Estimation, M Mara, D Luebke, M McGuire, Proceeding I3D '13 Proceedings of the ACM SIGGRAPH Symposium on Interactive 3D Graphics and Games, Pages 71 to 78) and so forth.

Figure 3:
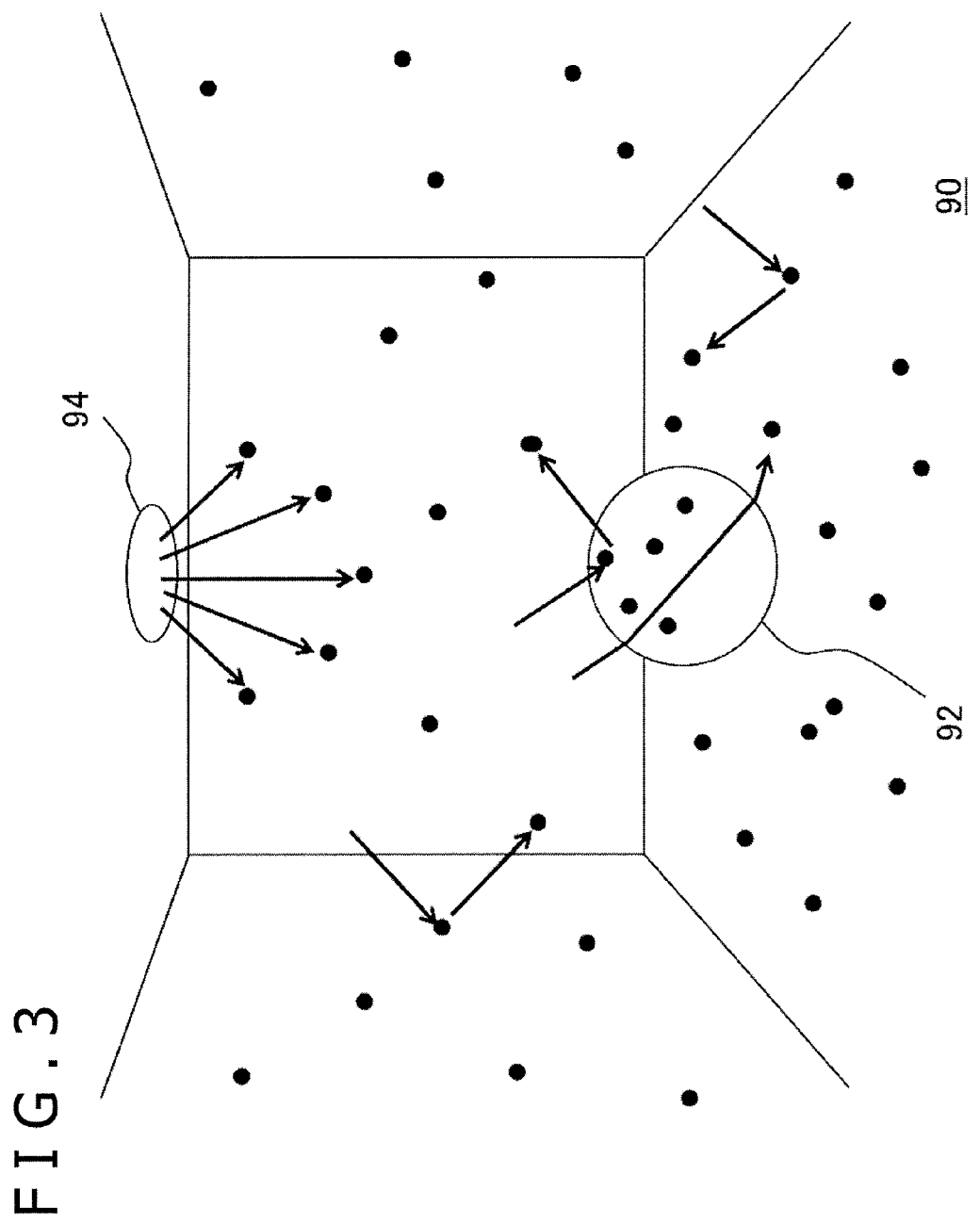
FIG. 3 is a diagram schematically showing how photons are scattered in a photon mapping method of the embodiment.

FIG. 3 schematically shows how photons are scattered in the photon mapping method. In this example, in a virtual three-dimensional space 90 as a rendering target, a sphere 92 is placed in a room and a light source 94 is set on a ceiling. In FIG. 3, the photons scattered in the virtual three-dimensional space 90 are indicated by black dots. However, the number of photons actually discharged is in e.g. a range of tens of millions to hundreds of millions or more depending on the desired image quality and FIG. 3 schematically shows only part of the photons. First, the photons are discharged from the light source 94 as shown by arrows.

The distribution of the discharge direction and the radiant flux of each photon are decided according to the shape and brightness of the set light source 94. When the discharged photons move in the space and reach the surface of the object such as a wall, the floor, or the sphere 92, the behavior thereof at the surface is decided based on predefined probabilities. Specifically, the probabilities of the behavior of the photon, such as remaining at the reaching point (absorption), reflection, transmission, and refraction in the case of transmission, are set in advance based on the materials and so forth of the objects, and the photons are stopped or further moved at a rate based on the probabilities. This can express indirect light generated by the bouncing of light that impinges on a wall or the floor and light transmitted through an object having transparency.

During the propagation of the photons in the space, the number of times of reflection at the object surface and the number of times of transmission are recorded on each photon basis. When these numbers of times reach preset upper limits, the photon is made to be absorbed by the object surface without further reflection and transmission. Consequently, the propagation of all photons ends finally. At this time, for each photon, a parameter set like {coordinates of absorption position, radiant flux, incident angle, the number of times of reflection, the number of times of transmission} is recorded. The photon map generator 38 stores this data in the photon map storage 40 as the photon map.

Figure 4:
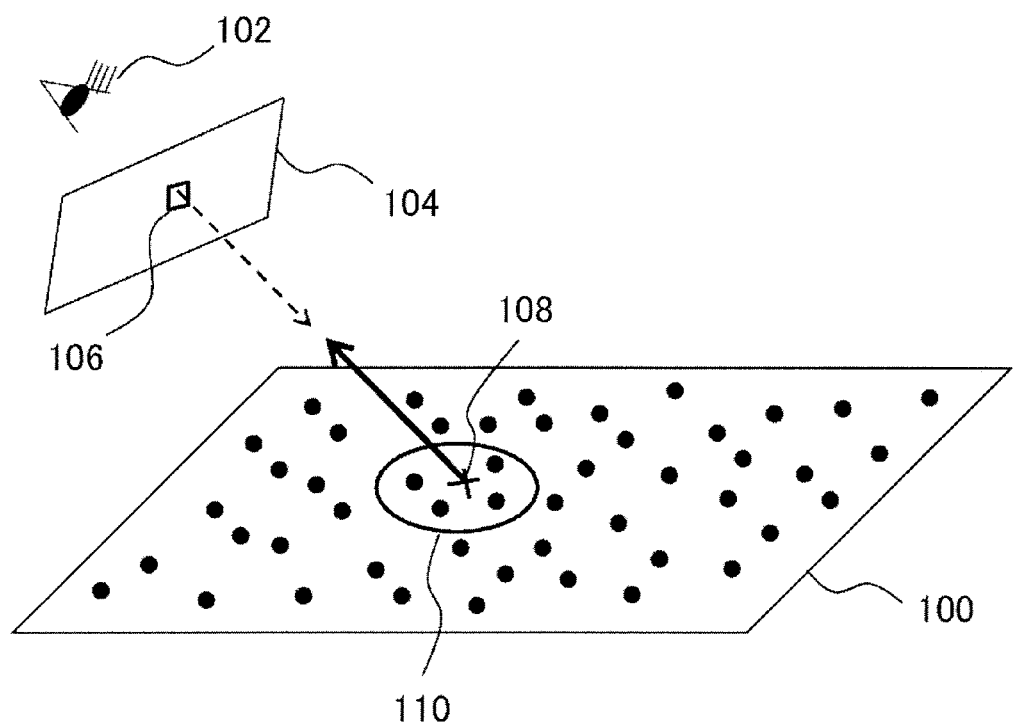
FIG. 4 is a diagram for explaining a method for calculating the radiance to a screen plane by using a generated photon map in the embodiment.

FIG. 4 is a diagram for explaining a method for calculating the radiance to a screen plane by using a generated photon map. First, on the surface of an object 100 (only a floor is shown in FIG. 4 for easy understanding) in a virtual three-dimensional space, photons, to be exact, the absorption positions of the photons, are distributed as described by the photon map. In FIG. 4, they are represented by black dots. The state when light made by such photon distribution is seen from a viewpoint 102 is calculated as the radiant to each pixel on a screen plane 104.

For example, in the case of obtaining the radiance to a pixel 106, a corresponding place 108 to be projected onto this pixel 106 on the surface of the object 100 is obtained and photons existing (absorbed) in a predetermined range from this corresponding place 108 are collected. Alternatively, a predetermined number of photons in this predetermined range are collected in order of increasing distance from the corresponding place 108. In FIG. 4, this range is conceptually shown by a circle 110. For decision of the photons as the collection target, generally a search method such as a kd-tree method is used. Then, by using the parameters associated with the collected photons, radiance L in the direction toward the pixel 106 is calculated as follows.

$$L(x, \vec{\omega}) = \int_{\Omega} f_r(x, \vec{\omega}_i, \vec{\omega}) L_i(x, \vec{\omega}_i) \cos\theta_i \, d\vec{\omega}_i$$

$$\approx \sum_{p=1}^{n} f_r(x, \vec{\omega}_p, \vec{\omega}) \frac{\Delta\Phi_p(x, \vec{\omega}_p)}{\Pi r^2}$$

[Expression 1]

The first row in the above expression is a general rendering equation. x is the position in the three-dimensional space and ω is the output direction vector. $\omega_i$ is the incident direction vector and $f_r$ is a bidirectional reflectance distribution function (BRDF). $L_i$ is the radiance of the incident light and $\theta_i$ is the angle formed by the normal vector to an object at the incident position and the incident direction vector. When this rendering equation is approximated by using radiant flux ΔΦp per unit solid angle possessed by one photon, the second row in the above expression is obtained. In the second row, n is the number of collected photons and $\pi r^2$ is the area when the collection target range of the photons is projected onto the object surface. The radiant flux Φp of each photon may be multiplied by a weighting coefficient that decreases in association with the distance of the photon from the corresponding place 108.

Figure 5:
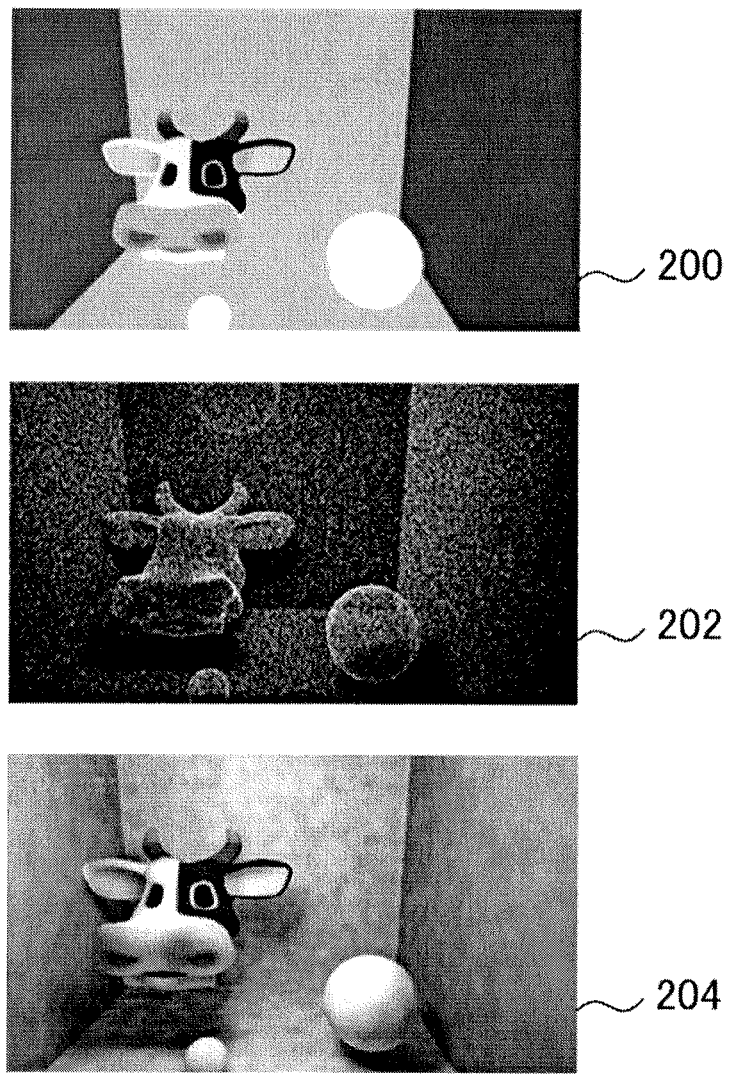
FIG. 5 is a diagram showing a practical example of rendering processing using a photon map applied in the embodiment.

By totaling up the radiance to which the photons near the corresponding place 108 contribute in the virtual three-dimensional space in this manner, the luminance at the pixel 106 can be calculated. FIG. 5 shows a practical example of the rendering processing using a photon map. First, an image 200 on the upper row is an image before shading and is obtained by projecting an object model of a virtual three-dimensional space formed of a cow, a sphere, and so forth onto a screen plane. An image 202 on the middle row shows photon distribution obtained as a result of scattering 500000 photons in such a virtual three-dimensional space. Although this diagram is represented in a state in which the distribution is projected onto the screen plane for comparison, the distribution in the three-dimensional space is recorded in the photon map.

An image 204 on the lower row is a display image obtained by subjecting the image 200 on the upper row to shading and shadowing by using the photon map. The luminance is low and natural shadows are expressed at parts where the distribution of the photons is low, such as a part between the cow and the floor and a part near the contact point of the sphere to the floor. In the present embodiment, e.g. the following parts are identified as the low-luminance regions in advance: part near the contact point of the sphere to the floor; hollow part as a surface shape of the cow; black part such as cow's eyes; and part where a shadow is generated due to direct light from the light source. Furthermore, when the pixel 106 as the calculation target exists in the low-luminance region, the number of terms included in the summation in the above expression, i.e. "n," is reduced by reducing the number of extracted photons, so that the load of the calculation is alleviated.

Figure 6:
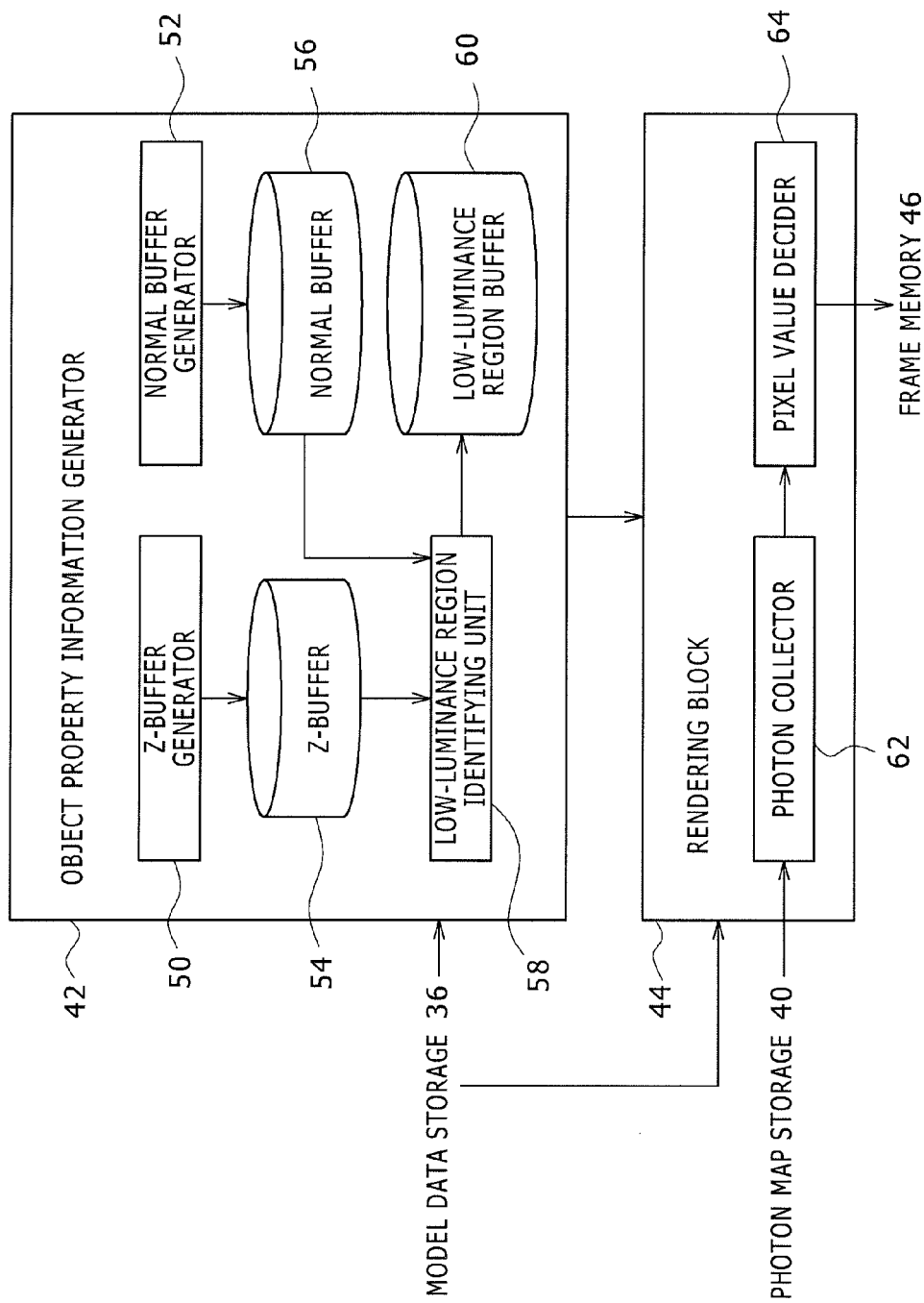
FIG. 6 is a diagram showing functional blocks configuring an object property information generator and a rendering block in the embodiment in more detail.

FIG. 6 shows functional blocks configuring the object property information generator 42 and the rendering block 44 in more detail. As described above, the object property information generator 42 identifies regions where the influence on the appearance is small even when the energy calculation of photons is reduced. Examples of such regions include a region representing a small space formed attributed to the shape and placement of an object, a shadow part generated depending on the relationship between the light source and an object, and a part having a color of low luminance originally as a model. Various methods will be available as the method for identifying these regions.

For example, to identify the region of a small space, using screen-space ambient occlusion (SSAO) as one of calculating methods of global illumination will be possible. Furthermore, to identify the shadow region generated by direct light depending on the relationship between a light source and an object, a shadow mapping method and a shadow volume method can be used. The region of a color of a low luminance value can be identified by extracting a part with a luminance value lower than a predetermined luminance value in a texture.

FIG. 6 shows functional blocks for the case of identifying the region of a small space by SSAO among these methods. In this case, the object property information generator 42 includes a Z-buffer generator 50, a normal buffer generator 52, a Z-buffer 54, a normal buffer 56, a low-luminance region identifying unit 58, and a low-luminance region buffer 60. The Z-buffer generator 50 generates and updates the Z-buffer 54 in which the position in the depth direction from a viewpoint is represented on a screen plane about visible points in object surfaces existing in the field of view. The normal buffer generator 52 generates and updates the normal buffer 56 in which normal vectors at the visible points in object surfaces existing in the field of view are represented on the screen plane.

The low-luminance region identifying unit 58 refers to the Z-buffer 54 and the normal buffer 56 and obtains the degree of occlusion of the object surface by calculation expressions to be described later for each position on the screen plane. The "degree of occlusion" is the degree of narrowing of a space due to e.g. the adjacency of objects to each other or forming of a deep depression as the shape of an object. It can be said that, when a region has a higher degree of occlusion, it is more difficult for ambient light to reach the region and the region is more likely to have low luminance. The low-luminance region identifying unit 58 decides the low-luminance regions on the screen plane based on the distribution of the degree of occlusion obtained in this manner to thereby generate and update the low-luminance region buffer 60.

The low-luminance region identifying unit 58 may identify the low-luminance regions by the shadow mapping method or the shadow volume method as described above. The shadow mapping method is a method in which the depth values of objects when a light source is deemed as a virtual viewpoint are created as a shadow map and whether a shadow is present or absent is determined by comparing the distance of the position of a rendering target from the light source as viewed from a viewpoint with the depth value stored in the shadow map. The shadow volume method is a method in which vectors from a light source to the respective vertexes are extended and triangular regions made by the intersecting of the extended vectors are subjected to arithmetic processing to obtain shadow regions. In the case of identifying shadow regions by these methods, a stencil buffer (not shown) and a shadow map are appropriately generated.

The low-luminance region identifying unit 58 may identify the low-luminance regions by any of the above-described methods or a combination thereof to generate and update the low-luminance region buffer 60. The rendering block 44 includes a photon collector 62 and a pixel value decider 64. The photon collector 62 refers to the photon map stored in the photon map storage 40 and collects photons corresponding to each pixel on the screen plane as described with reference to FIG. 4. At this time, the photon collector 62 refers to the low-luminance region buffer 60 and reduces the photons to be collected about the low-luminance region.

However, the photon collector 62 sets exceptional processing in which the amount of collected photons is not reduced even when the relevant region is the low-luminance region based on the history information until the photon corresponding to the low-luminance region reaches the relevant position. This can express e.g. a caustics phenomenon in which light transmitted through an object having transparency is gathered through refraction and the light shines in a shadow. The pixel value decider 64 obtains the radiance on each pixel basis by the above expression based on the parameters associated with the collected photons. Then, the pixel value decider 64 performs shading and shadowing based on the radiance for the image obtained by projecting the object model onto the screen plane to thereby generate a display image and store it in the frame memory 46.

Next, a description will be made about the method in which the low-luminance region identifying unit 58 calculates the degree of occlusion of an object surface with respect to a screen plane by using SSAO. A specific method of SSAO is described in detail in e.g. a non-patent document (The Alchemy Screen-Space Ambient Obscurance Algorithm, Morgan McGuire et. al., Proceedings of ACM SIGGRAPH/Eurographics High-Performance Graphics 2011 (HPG '11)).

Figure 7:
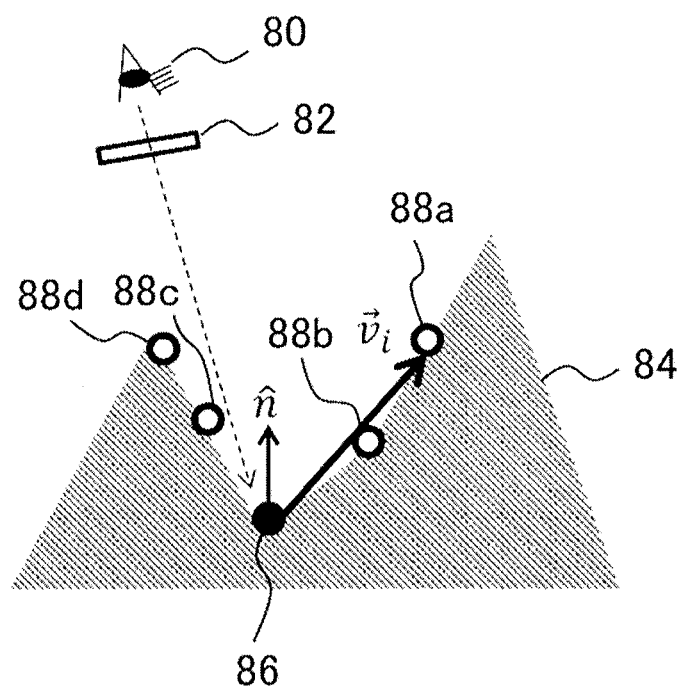
FIG. 7 is a diagram for explaining a calculating method of screen-space ambient occlusion applied in the embodiment.

FIG. 7 is a diagram for explaining a calculating method of SSAO. First, a consideration will be made about the case of rendering an image by projecting an object 84 onto a screen 82 corresponding to a viewpoint 80. In this case, as described above, a normal buffer is generated in which the normal vector to the object 84 in the three-dimensional space is represented about each position of the object 84 in the screen plane. In addition, a Z-buffer is generated in which the positions of the object 84 in the depth direction from the viewpoint are represented on the screen plane. Then, plural sample points 88a, 88b, 88c, 88d, . . . are generated on the object 84 based on a predetermined rule for a target point 86 about which the degree of occlusion is desired to be obtained.

Although the sample points 88a, 88b, 88c, 88d, . . . are represented on the object 84 in the three-dimensional space in FIG. 7, actually they are generated on the screen plane. For example, a predetermined number of sample points may be randomly distributed within a circle centered at the target point 86 and having a predetermined radius, or may be normally distributed with a predetermined variance. Then, for each sample point, the inner product of a reference vector $v_i$ from the target point 86 to the sample point and a normal vector n at the target point 86 is calculated.

It can be said that, when the value of this inner product is larger, the acute angle formed by the normal vector n and the reference vector $v_i$ is steeper, i.e. the contribution of the part of the sample point in the object 84 to the occlusion of the target point 86 is greater. In practice, magnitude $S_i$ of the contribution of the i-th sample point to the occlusion can be calculated as follows.

$$S_i = \frac{\max(0, \vec{v}_i \cdot \hat{n} + z_c \beta)}{\vec{v}_i \cdot \vec{v}_i + \epsilon} \quad \text{[Expression 2]}$$

In this expression, the vector $v_i$ is the vector to the i-th sample point and the vector n is the normal vector of the target point. The former can be obtained from the position coordinates of each place on the object surface in the three-dimensional space, obtained from the Z-buffer. The latter can be acquired from the normal buffer. $Z_c$ is the position of the target point in the depth direction, retained by the Z-buffer. Specifically, the last term of the numerator is introduced when the depth of shading is changed according to the distance of the target object from the viewpoint, and $\beta$ is a weighting coefficient to control the degree of the effect of this term. $S_i$ is obtained by normalizing such an inner product value by $v_i \cdot v_i$.

$\epsilon$ is a constant for preventing the denominator from becoming 0 and thus a minute value is set as $\epsilon$ in advance. When the inner product assumes a negative value, the normal vector n and the reference vector $v_i$ form an obtuse angle and thus the corresponding sample part does not contribute to the occlusion. Therefore, the lower limit of $S_i$ is zero as shown in the above expression. The degree of occlusion at the target point 86 is obtained by summing $S_i$ regarding all sample points and obtaining the average value thereof. An evaluation value A that is in a range of zero to one and comes closer to zero when the degree of occlusion is higher is represented by the following expression.

$$A \approx \max\left(0, 1 - \frac{2\sigma}{s} \cdot \sum_{i=1}^{s} \frac{\max(0, \vec{v}_i \cdot \hat{n} + z_c \beta)}{\vec{v}_i \cdot \vec{v}_i + \epsilon}\right)^k \quad \text{[Expression 3]}$$

In this expression, s denotes the number of sample points and $\sigma$ is a coefficient that determines the depth of a shadow to be given. Furthermore, k is a parameter that determines the locality of the shadow and is appropriately adjusted according to the contents of the image to be displayed and so forth. By performing the same calculation with all pixels in the screen plane set as the target point, the distribution of the evaluation value A in the screen plane is obtained. For example, the low-luminance region identifying unit 58 decides a region having the evaluation value A equal to or smaller than a threshold value as the low-luminance region and generates the low-luminance region buffer 60 in which the pixel values in this region are represented by the respective evaluation values A. Furthermore, the photons to be collected are reduced about this low-luminance region.

For example, if the number of photons existing in a predetermined range corresponding to a pixel is Np, the number is multiplied by the evaluation value A, i.e. only Np×A photons are collected. If this is employed, when the degree of occlusion is higher, i.e. when the luminance is assumed to be lower, the rate of the photons to be collected can be made lower. Alternatively, regarding the pixel belonging to the low-luminance region, the photons to be collected may be reduced at the same predetermined rate. Alternatively, for this pixel, the luminance value may be decided by another measure without collecting photons. At this time, the luminance value may be decided in accordance with such a predetermined calculation expression that a smaller evaluation value A yields lower luminance. This can omit the extraction itself of photons. Also when the low-luminance regions are identified by a method other than the method based on the above expressions, the luminance value may be separately decided based on a rule according to the method.

As described thus far, in the present embodiment, after a photon map is generated, processing of collecting photons at positions corresponding to a pixel and calculating the radiance from the radiant flux of the photons is executed about all pixels. To carry out this at high speed in association with the movement of the viewpoint, parallelization of the processing is effective. Specifically, the processing is assigned to plural processors for each of tile regions obtained by dividing a screen plane into a predetermined size in the vertical direction and the horizontal direction. Such parallel processing can be easily implemented by using the architecture of an existing GPU.

Figure 8:
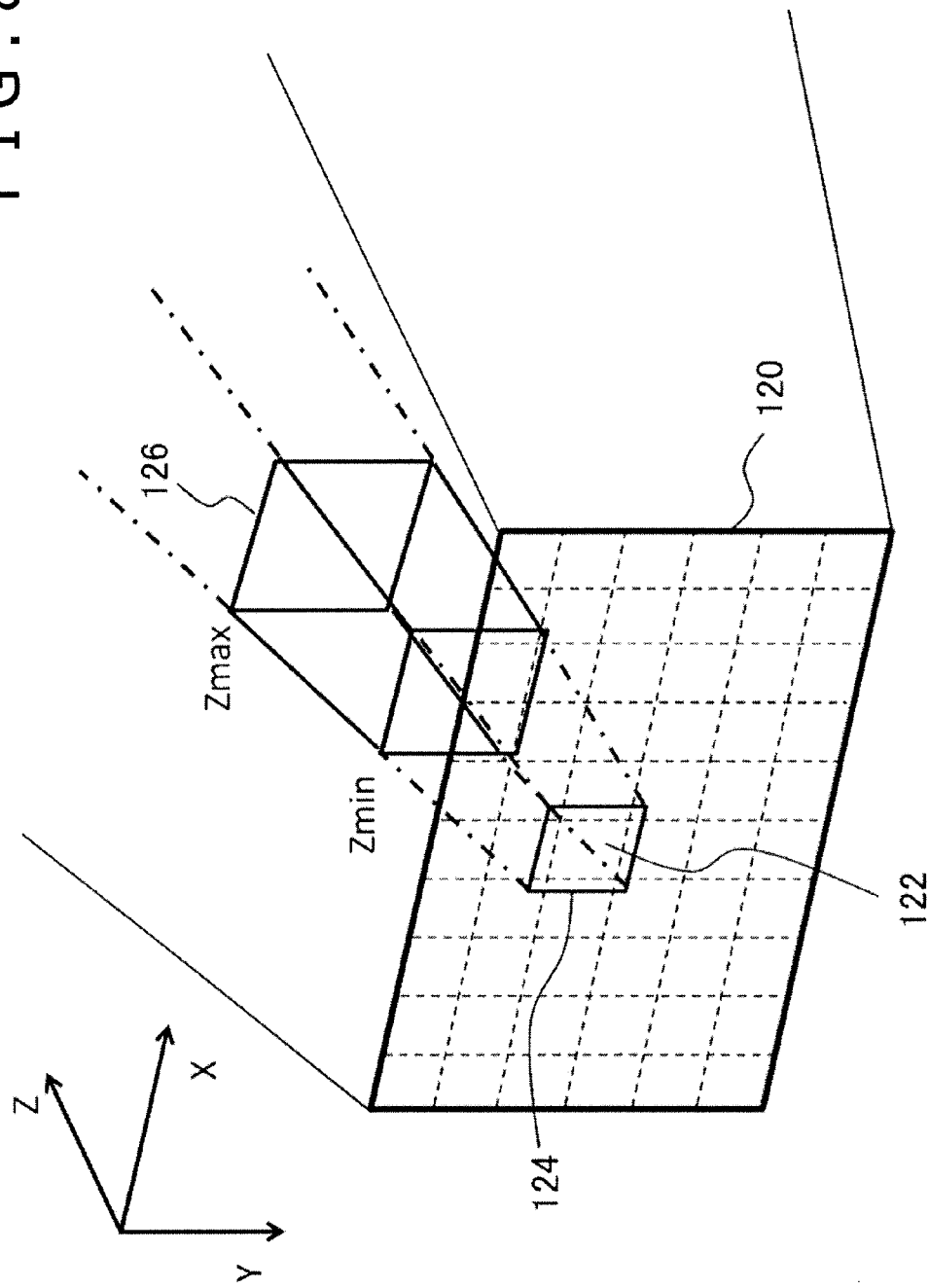
FIG. 8 is a diagram for explaining a method for parallelizing calculation processing of the luminance in the embodiment.

FIG. 8 is a diagram for explaining a method for parallelizing calculation processing of the luminance. First, a screen plane 120 is divided into a predetermined size in the vertical direction and the horizontal direction to define tile regions. In FIG. 8, dotted lines along the vertical direction and the horizontal direction separating the screen plane 120 represent the boundaries between the tile regions. When the horizontal direction of this screen plane 120 is defined as the X-axis and the vertical direction is defined as the Y-axis, a virtual space to be projected onto the screen plane forms a three-dimensional space of X, Y, and Z like one shown in the diagram. When the value of Z is larger, i.e. when the distance from the screen plane 120 is longer, the region that falls within the field of view is wider. Therefore, the region of the three-dimensional space projected onto a rectangular region on the screen plane 120 forms a square frustum as shown in the diagram.

Here, a consideration will be made about the collection target region of photons used for luminance calculation of all pixels in a certain tile region 122. The photons collected for each pixel exist in a predetermined range from the place corresponding to the pixel in the three-dimensional space. Therefore, considering the pixels at the tile region ends, the collection target region is a region obtained by expansion corresponding to the predetermined range in the XY-plane as a margin. In FIG. 8, an expanded region 124 is set with respect to the tile region 122. Moreover, considering that the photons exist on object surfaces in the three-dimensional space and photons at visible points among them contribute to the luminance value of the pixels, the collection target region corresponding to the tile region 122 is a region of a square frustum 126, whose range of the distance Z in the depth direction is restrictive.

The range of Z that defines the square frustum 126 is determined by the position of the surface of an object close to the screen plane 120. Thus, the Z-buffer 54 in the object property information generator 42 can be used. Specifically, it suffices to cut out, from a region of a square frustum that has the expanded region 124 as its upper surface and ranges to infinity, a region from a minimum value Zmin of the depth value in this region to a maximum value Zmax. Then, information on the photons existing in this square frustum 126 is copied into a local memory of a processor to which the tile region 122 is assigned. This is similarly carried out in plural processors and processing is concurrently executed, which can implement the parallel processing.

Specifically, each processor collects the photons existing in the corresponding range among the photons copied into the local memory for each of the pixels included in the assigned tile region, to thereby calculate the radiance for the pixel. There is a possibility that the copied photons also include photons existing at a part that is not a visible point, such as a part on the backside of an object. Thus, photons on visible points are collected by general culling processing.

Figure 9:
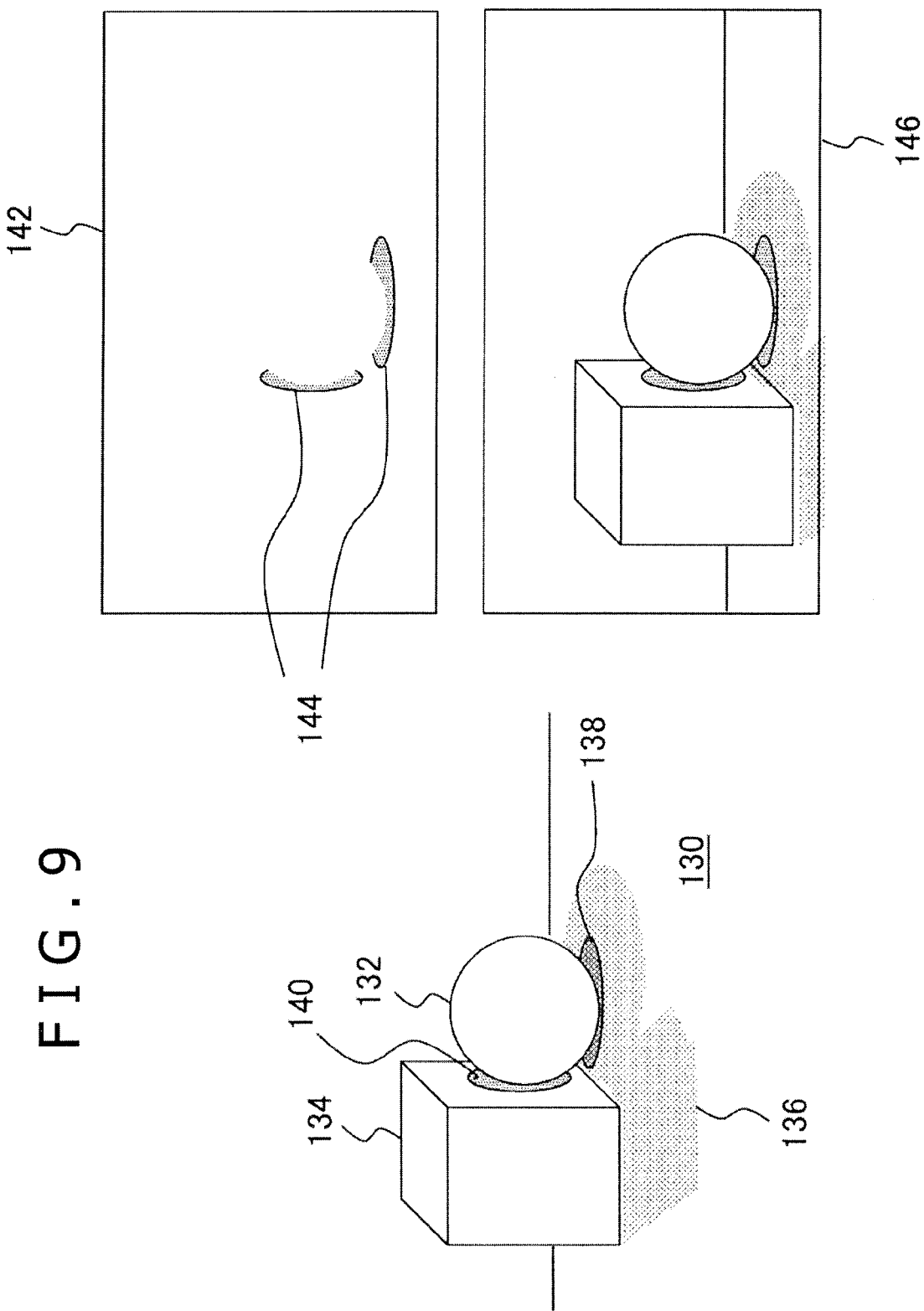
FIG. 9 is a diagram for explaining the relationship between low-luminance regions identified by the object property information generator and a display image generated by the rendering block in the embodiment.

FIG. 9 is a diagram for explaining the relationship between low-luminance regions identified by the object property information generator 42 and a display image generated by the rendering block 44. First, as shown on the left side in FIG. 9, a sphere 132 and a rectangular parallelepiped 134 are placed close to each other in a virtual three-dimensional space 130 as a rendering target. Suppose that, in this case, shadows 136, 138, and 140 are generated due to illumination and the positional relationship and shapes of these objects. Although actually the shadows 136 and 138 are one continuous region, the density of shading is changed between them in FIG. 9 for explanation. This is the same also in a display image 146.

To render such a space as the display image, first the object property information generator 42 calculates the evaluation value A representing the degree of occlusion on each pixel in the screen plane. An image 142 is made by indicating, on the screen plane, regions where the evaluation value A is equal to or smaller than a threshold value, i.e. regions 144 with a high degree of occlusion. In the case of FIG. 9, the degree of occlusion is high in the vicinity of the contact point between the sphere 132 and the rectangular parallelepiped 134 and in the vicinity of the contact point between the sphere 132 and the floor. Therefore, the evaluation value A of the regions 144 corresponding to these vicinities is small on the screen plane. Such regions 144 are deemed as low-luminance regions because it is expected that it is difficult for ambient light to reach the regions 144 and thus the luminance of the regions 144 is lower than the other region.

The rendering block 44 calculates the radiance to each pixel after reducing the number of collected photons in the low-luminance regions and collecting all photons regarding the other region. The rendering block 44 renders the respective objects based on the calculation result and thereby the display image 146 is generated. That is, by performing the calculation after collecting the photons as usual except for the low-luminance regions 144, natural shading can be expressed without changing the impression as a whole although the calculation is locally simplified. In particular, if the number of collected photons is adjusted at a rate based on the evaluation value A, the possibility that the boundary between the low-luminance region and the other region is visually recognized becomes extremely low. As described above, for the low-luminance regions 144, shadows may be given based on a rule separately prepared instead of obtaining the radiance from the photons.

Figure 10:
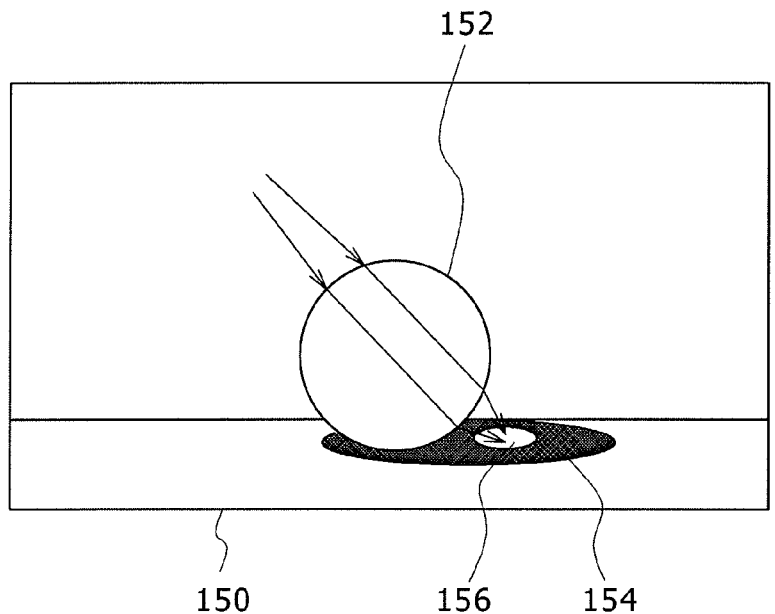
FIG. 10 is a diagram for explaining a method for expressing caustics in the embodiment.

FIG. 10 is a diagram for explaining a method for expressing caustics, i.e. shining of light in a shadow. In an image 150, if a sphere 152 as a rendering-target object is formed of a material having transparency, such as glass, light transmitted and refracted is collected and a bright part (caustics) 156 is generated in a shadow 154 in some cases. Here, if part of the shadow 154 is identified as a low-luminance region, reducing the number of collected photons or making a shadow by another method possibly causes a problem that the caustics disappears or a difference in the luminance is generated at the boundary from originally-continuous caustics outside the low-luminance region.

Thus, in the present embodiment, it is determined whether caustics is generated from history information on reactions with objects in the path until absorption of the photon as described above. Specifically, in a region in which a photon with a history of having been transmitted through an object exists, the number of collected photons is not reduced even when the region is a low-luminance region. Besides, it may be determined whether caustics is generated based on a stricter determination criterion such as a region in which a photon transmitted through an object immediately before being absorbed exists, a region in which a photon transmitted through an object with refraction exists, and a region in which a predetermined number or more of such photons exist or such photons exist at a predetermined density or higher. If it is determined that the caustics 156 is generated in this manner, all photons are collected about the pixel whose corresponding region is included in the collection target region. This can naturally express the caustics.

Figure 11:
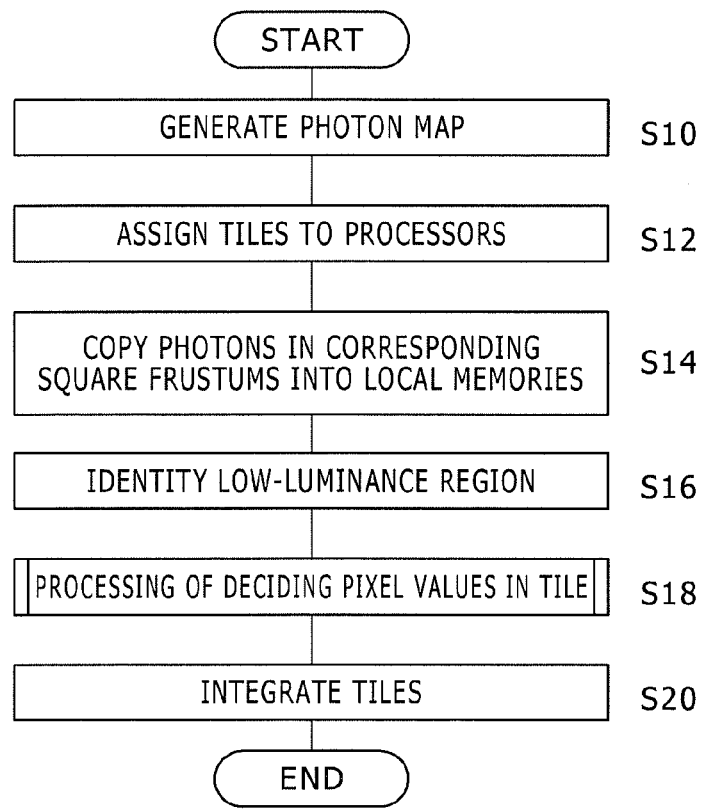
FIG. 11 is a flowchart showing a processing procedure in which an image processing section of the image processing device in the embodiment generates a display image by photon mapping.

Next, a description will be made about the operation of the image processing device 10 implemented by the configuration described thus far. FIG. 11 is a flowchart showing a processing procedure in which the image processing section 34 of the image processing device 10 generates a display image by photon mapping. This processing is executed by the image processing section 34 in response to a request for image processing issued in the process of progression of a game or the like by the information processing section 32 in accordance with user inputs. First, the photon map generator 38 of the image processing section 34 constructs a virtual three-dimensional space with a placement specified from the information processing section 32 and then radiates photons from a predetermined light source to thereby generate a photon map (S10).

The generated photon map is stored in the photon map storage 40. Unless an object moves, the subsequent processing can be executed by using the same photon map. Next, as described with reference to FIG. 8, tile regions obtained by dividing a screen plane are sequentially assigned to processors (S12) and photons in square frustums corresponding to the assigned tile images in the three-dimensional space are copied into local memories (S14). The processing of S12 and S14 is executed when the rendering block 44 is configured by a GPU having plural processors or the like and decision of the pixel values is carried out in parallel in units of tile region.

In this case, the tile region that is not assigned to the processor at once is assigned as appropriate to the processor that has ended the processing of the previous tile region. In parallel with the processing of S12 and S14, the object property information generator 42 identifies low-luminance regions in the screen plane in the above-described manner (S16). Then, the rendering block 44 collects the corresponding photons and calculates the radiance to decide the pixel value about all pixels in the tile region (S18). In this step, the number of collected photons is reduced for the low-luminance regions identified in S16 in principle to thereby reduce the load of the calculation.

After the pixel values are decided about all tile regions, these tile regions are returned to the original positions on the screen plane to be integrated into one display image (S20). The display image thus generated is stored in the frame memory 46 and is so controlled as to be displayed to a display device at proper timing. The image processing section 34 repeats this series of processing at a predetermined rate while responding also to the movement of the viewpoint and changes in the objects controlled by the information processing section 32. A moving image such as a game screen is thereby displayed on the display device.

FIG. 12 is a flowchart showing a processing procedure in which the rendering block 44 decides the pixel values in the tile region in S18 in FIG. 11. Suppose that the pixels in the tile are given an identification number i (i=0, 1, 2, . . . ) in predetermined order. First, about the first pixel (i=0) (S30), the photon collector 62 checks whether or not this pixel is included in a low-luminance region (S32). If it is not included (N of S32), the photon collector 62 collects all of the photons in the collection target range corresponding to this pixel (S34). On the other hand, if this pixel is included in a low-luminance region (Y of S32), the photon collector 62 refers to the history information of the photons in the collection target range corresponding to this pixel and checks whether or not there is a photon that satisfies the condition under which it is determined that the photon generates caustics, such as a condition that the number of times of transmission is larger than zero (S36).

If the photon satisfying the condition exists (Y of S36), the photon collector 62 collects all of photons although the pixel is included in a low-luminance region (S34). If there is no photon satisfying the condition (N of S36), the photon collector 62 collects only part of the photons in the collection target range corresponding to the pixel (S38). The rate of the photons collected at this time may be based on the evaluation value A representing the degree of occlusion or may be a constant value. Preferably, the photons as the collection target are randomly selected so that the occurrence of bias can be avoided. Depending on the processing capability of the device, the number of collected photons may be reduced at a predetermined rate instead of collecting all of the photons in the collection target range in S34. Also in this case, the photons are collected at a rate higher than the collection rate of photons in the low-luminance region.

Subsequently, the pixel value decider 64 calculates the radiance in the direction toward the pixel by using the radiant flux and incident angle of the photons collected by the processing of S34 or S38 (S40). Then, the pixel value decider 64 decides the pixel value of the target pixel based on the radiance (S42). About the low-luminance region, the luminance may be decided by a method other than the photon collection or the luminance based on the collected photons and the luminance decided by another method may be combined through averaging or the like. Such processing is repeated in order of the identification number about all pixels in the tile region (N of S44, S46, S32 to S42). If the pixel values of all pixels are decided, the processing is ended (Y of S44).

In the processing procedure shown in FIG. 12, the pixel value of a region of caustics is decided as exceptional processing of the low-luminance region by making the determination of the low-luminance region in S32 and the determination of the caustics in S36 at once. On the other hand, the processing for expressing caustics may be separated from the processing for the other region and the final pixel values may be decided through two-stage processing. Specifically, at the stage of creation of a photon map in S10 in FIG. 11, a photon map composed only of the photons satisfying the condition under which caustics is generated is made separately from a photon map composed of the other photons.

Then, in the processing of deciding the pixel values in the tile region, first the determination of the low-luminance region in S32 is carried out by using the latter photon map and, about the low-luminance region, the pixel value is decided by collecting only part of photons as in S38 without the exceptional processing. At this time, the region of caustics is in an uncompleted state. Therefore, moreover, the pixel value of the region of caustics is decided by using the photon map composed only of the photons satisfying the condition under which caustics is generated. In this case, the determination of the low-luminance region in S32 is omitted and all photons are collected as in S34.

In the method described thus far, in determining the low-luminance regions in S32, the object property information generator 42 calculates parameters such as the degree of occlusion on the spot. As another method, a part that should be represented as a low-luminance region and a part that may be represented as a low-luminance region may be set in a virtual three-dimensional space in advance. For example, a part where a shadow should be always generated and a part that is not important in design are decided at the design stage of a virtual world and these parts are masked by a texture or the like. Then, in the determination processing of S32, the pixel included in the region obtained by projecting this masked region onto a screen plane is determined to be a low-luminance region.

Alternatively, irrespective of the result of the determination of the low-luminance region in S32, always only part of photons may be collected regarding the photons distributed in this masked region. In either case, the photons as the collection target may be reduced at the same rate across the whole surface of the masked region. Alternatively, the distribution of the reduction rate may be set in advance in the texture to make the mask and the photon collection rate may be varied based on this distribution. This can omit at least part of the calculation for the determination of the low-luminance region and further reduce the load of the processing.

Similarly, also in a case in which a region of caustics is known in advance, such as a case in which the positional relationship between a light source and an object is fixed, the place of the occurrence thereof may be calculated and set in a virtual three-dimensional space in advance. In this case, all photons are collected about the pixel included in the region obtained by projecting this region onto a screen plane. Alternatively, all of the photons in this region are collected. This can omit the processing of checking the history information of the photons.

According to the present embodiment described above, in shading and shadowing using a photon mapping method, regions expected to have low luminance are separately identified on a screen plane. Then, in collecting photons corresponding to the regions, the number of collected photons is reduced to reduce the load of the radiance calculation. By simplifying the calculation only for the regions where the luminance is low, the speed of the rendering processing can be increased without the deterioration of the overall image quality.

As measures to reduce the processing load, in a simple thought, reducing the number of scattered photons and reducing the number of collected photons across the whole image will be available. However, in the former measure, the photons do not spread to detail and it is difficult to obtain a high-definition image. In the latter measure, the distribution of the photons as the collection target is biased or changes every frame depending on the selection of the photons to be collected, which possibly causes noise and flicker. By selectively reducing the number of collected photons only for the low-luminance regions, where such troubles are inconspicuous, a sufficient number of photons can be used about the other region and consequently the quality of the whole image can be improved.

Furthermore, by using the history information of each photon in creation of a photon map, an option of exceptional processing in which the number of collected photons is not reduced even when the relevant region is a low-luminance region is set. This can surely express caustics and the occurrence of a trouble due to the reduction in the number of collected photons can be avoided.

The present disclosure is described above based on the embodiment. The above embodiment is exemplification and it is to be understood by those skilled in the art that various modification examples can be made regarding combinations of the respective constituent elements and the respective processing processes in the embodiment and such modification examples are also included in the scope of the present disclosure.

The present disclosure contains subject matter related to that disclosed in Japanese Priority Patent Application JP 2014-114334 filed in the Japan Patent Office on Jun. 2, 2014, the entire content of which is hereby incorporated by reference.

What is claimed is:
1. An image processing device comprising:
    a photon map generator configured to construct a virtual three-dimensional space as a rendering target and generate a photon map by distributing photons used for a photon mapping method;
    a low-luminance region identifying unit configured to identify a low-luminance region estimated to have low luminance when the virtual three-dimensional space is projected onto a screen corresponding to a viewpoint; and
    a rendering part configured to collect photons corresponding to all pixels based on the photon map with reduction in a collection rate of photons corresponding to a pixel included in the low-luminance region compared with the other region, and calculate radiance to decide a pixel value and generate a display image,
    wherein the low-luminance region identifying unit identifies the low-luminance region by acquiring distribution of an evaluation value representing a degree of occlusion of ambient light by an object surface in the virtual three-dimensional space, and
    wherein the rendering part changes the collection rate of photons among pixels included in the low-luminance region based on the evaluation value.

2. The image processing device according to claim 1, wherein
the rendering part refers to history information of each photon about reaction with an object until absorption of the photon, recorded when the photon map generator generates the photon map, and takes an exceptional measure in which the collection rate of photons is not reduced if the history information of a photon corresponding to the pixel included in the low-luminance region satisfies a predetermined condition.

3. The image processing device according to claim 1, wherein
the low-luminance region identifying unit further identifies the low-luminance region by acquiring a shadow region generated by direct light based on a positional relationship between a light source and an object in the virtual three-dimensional space.

4. The image processing device according to claim 1, wherein
the low-luminance region identifying unit further identifies the low-luminance region based on a luminance value of a color represented by a texture of an object.

5. The image processing device according to claim 1, wherein
the rendering part decides a pixel value of the pixel included in the low-luminance region by combining radiance calculated based on collected photons with a value relating to luminance.

6. The image processing device according to claim 1, wherein
the rendering part sets the collection rate of photons corresponding to the pixel included in the low-luminance region to zero and decides a pixel value of the pixel based on a value relating to luminance obtained based on a shadow mapping method.

7. An image processing method in which an image processing device renders a display image to be displayed on a display device, the image processing method comprising:
constructing a virtual three-dimensional space as a rendering target and distributing photons used for a photon mapping method to generate and store a photon map in a memory;
identifying a low-luminance region estimated to have low luminance when the virtual three-dimensional space is projected onto a screen corresponding to a viewpoint; and
collecting photons corresponding to all pixels based on the photon map read out from the memory with reduction in a collection rate of photons corresponding to a pixel included in the low-luminance region compared with the other region, and calculating radiance to decide a pixel value and generate and output a display image to the display device,
wherein the collection rate of photons corresponding to the pixel included in the low-luminance region is set to zero, and
wherein the pixel value of the pixel is decided based on a value relating to luminance obtained based on a shadow mapping method.

8. A non-transitory computer-readable recording medium on which a computer program for a computer is recorded, the computer program comprising:
constructing a virtual three-dimensional space as a rendering target and generating a photon map by distributing photons used for a photon mapping method;
identifying a low-luminance region estimated to have low luminance when the virtual three-dimensional space is projected onto a screen corresponding to a viewpoint; and
collecting photons corresponding to all pixels based on the photon map with reduction in a collection rate of photons corresponding to a pixel included in the low-luminance region compared with the other region, and calculating radiance to decide a pixel value and generate a display image,
wherein the collection rate of photons corresponding to the pixel included in the low-luminance region is set to zero, and
wherein the pixel value of the pixel is decided based on a value relating to luminance obtained based on a shadow volume method.

9. A non-transitory computer-readable recording medium on which a computer program for a computer is recorded, the computer program comprising:
constructing a virtual three-dimensional space as a rendering target and generating a photon map by distributing photons used for a photon mapping method;
identifying a low-luminance region estimated to have low luminance when the virtual three-dimensional space is projected onto a screen corresponding to a viewpoint; and
collecting photons corresponding to all pixels based on the photon map with reduction in a collection rate of photons corresponding to a pixel included in the low-luminance region compared with the other region, and calculating radiance to decide a pixel value and generate a display image,
wherein the low-luminance region is identified by acquiring distribution of an evaluation value representing a degree of occlusion of ambient light by an object surface in the virtual three-dimensional space, and
wherein the collection rate of photons among pixels included in the low-luminance region is changed based on the evaluation value.

* * * * *